(12) United States Patent
Flynn

(10) Patent No.: US 10,451,100 B2
(45) Date of Patent: Oct. 22, 2019

(54) REUSABLE FASTENING CLIP ASSEMBLY

(71) Applicant: Illinois Tool Works Inc., Glenview, IL (US)

(72) Inventor: Gregory S. Flynn, Lake Orion, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/551,400

(22) PCT Filed: Feb. 2, 2016

(86) PCT No.: PCT/US2016/016124
§ 371 (c)(1),
(2) Date: Aug. 16, 2017

(87) PCT Pub. No.: WO2016/144438
PCT Pub. Date: Sep. 15, 2016

(65) Prior Publication Data
US 2018/0100531 A1    Apr. 12, 2018

Related U.S. Application Data

(60) Provisional application No. 62/132,083, filed on Mar. 12, 2015, provisional application No. 62/195,382, filed on Jul. 22, 2015.

(51) Int. Cl.
*F16B 5/06*    (2006.01)
*F16B 21/08*   (2006.01)
(Continued)

(52) U.S. Cl.
CPC ........ *F16B 21/086* (2013.01); *B60R 13/0206* (2013.01); *F16B 21/07* (2013.01); *F16B 5/0657* (2013.01)

(58) Field of Classification Search
CPC ..... F16B 21/086; F16B 21/07; B60R 13/0206
See application file for complete search history.

(56) References Cited

U.S. PATENT DOCUMENTS 5,211,519 A * 5/1993 Saito ................... F16B 19/1081
411/45
5,387,065 A * 2/1995 Sullivan .............. F16B 19/1081
411/45
(Continued)

FOREIGN PATENT DOCUMENTS

DE    102009051736    6/2010

OTHER PUBLICATIONS

International Search Report and Written Opinion for PCT/US2016/016124.

*Primary Examiner* — Jason W San
(74) *Attorney, Agent, or Firm* — Quarles & Brady LLP

(57) ABSTRACT

A fastening clip assembly is configured to be selectively connected and disconnected from a component. The fastening clip assembly may include a main body including a pin having a nose and at least one clip extending from a portion of the pin. A retaining sleeve receives and removably retains the pin. The retaining sleeve may include a tube defining a channel that receives the nose, and at least one wing having a locking head. The wing(s) inwardly deflects when the fastening clip assembly is inserted into an attachment hole of the component. The wing(s) is inwardly deflected by the clip(s) when the fastening clip assembly is removed from the attachment hole of the component.

20 Claims, 4 Drawing Sheets

(51) Int. Cl.
  *B60R 13/02* (2006.01)
  *F16B 21/07* (2006.01)

(56) References Cited

U.S. PATENT DOCUMENTS

| | | | | |
|---|---|---|---|---|
| 5,641,255 A * | 6/1997 | Tanaka | ................ | F16B 19/1081 |
| | | | | 411/45 |
| 6,039,523 A * | 3/2000 | Kraus | .................... | F16B 5/0628 |
| | | | | 411/48 |
| 6,264,393 B1 * | 7/2001 | Kraus | ................ | B60R 13/0206 |
| | | | | 24/297 |
| 7,033,121 B2 * | 4/2006 | Kirchen | ................ | F16B 19/008 |
| | | | | 24/453 |
| 7,188,393 B2 * | 3/2007 | Kawai | ................ | B60R 13/0206 |
| | | | | 24/297 |
| 7,222,398 B2 * | 5/2007 | Koike | .................... | B62D 27/02 |
| | | | | 24/297 |
| 7,231,696 B2 * | 6/2007 | Asano | ................ | B60R 13/0206 |
| | | | | 24/297 |
| 7,536,755 B2 * | 5/2009 | Nakajima | ................ | F16B 5/065 |
| | | | | 24/297 |
| 7,549,199 B2 * | 6/2009 | Bugner | ................ | F16B 5/0628 |
| | | | | 24/289 |
| 7,862,274 B2 * | 1/2011 | Limpert | .............. | B60R 13/0206 |
| | | | | 24/297 |
| 2009/0000085 A1 * | 1/2009 | Okada | ................ | F16B 19/1081 |
| | | | | 24/453 |
| 2014/0047679 A1 * | 2/2014 | Lepper | ................ | F16B 5/0657 |
| | | | | 24/453 |
| 2016/0138629 A1 * | 5/2016 | Flynn | ................ | F16B 19/1081 |
| | | | | 411/57.1 |
| 2016/0298668 A1 * | 10/2016 | Kanie | .................... | F16B 21/07 |
| 2017/0198738 A1 * | 7/2017 | Najima | .................... | F16B 19/10 |
| 2017/0291558 A1 * | 10/2017 | Meyers | .................... | B29C 45/16 |

\* cited by examiner

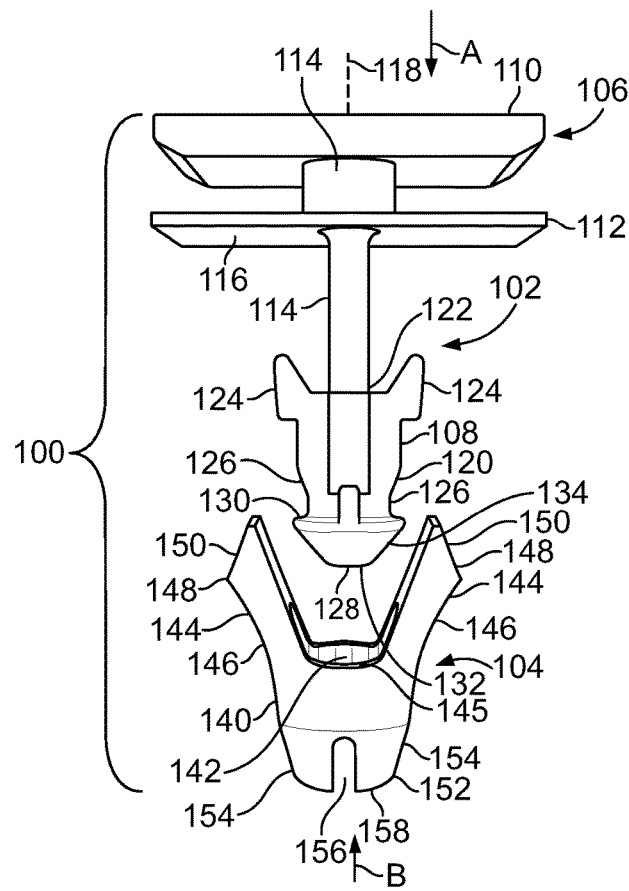
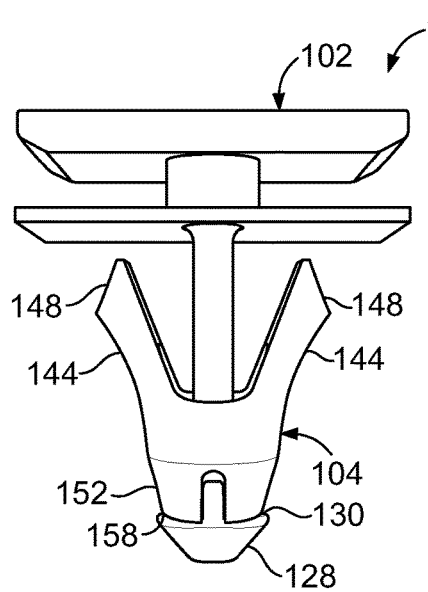
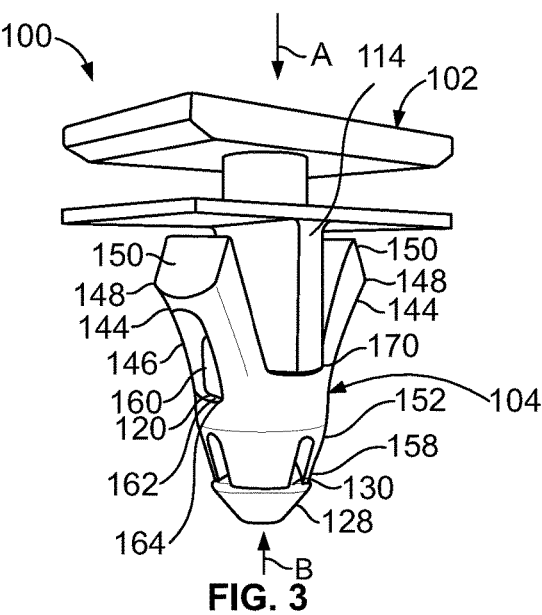

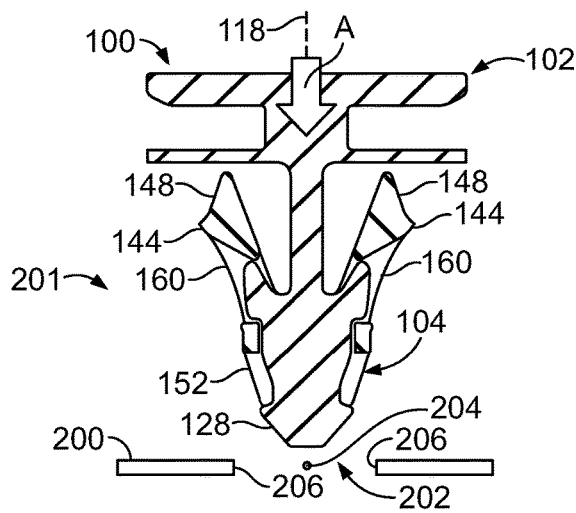
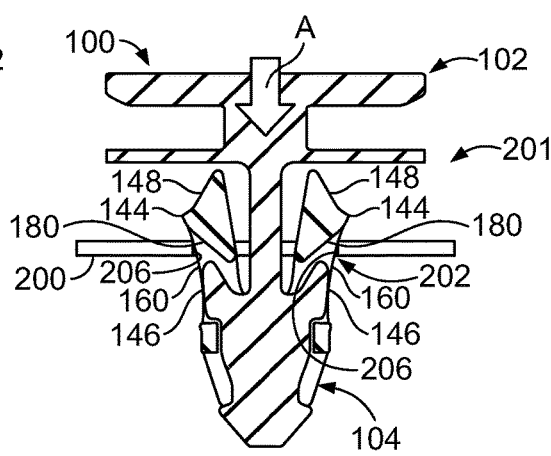
FIG. 5  FIG. 6
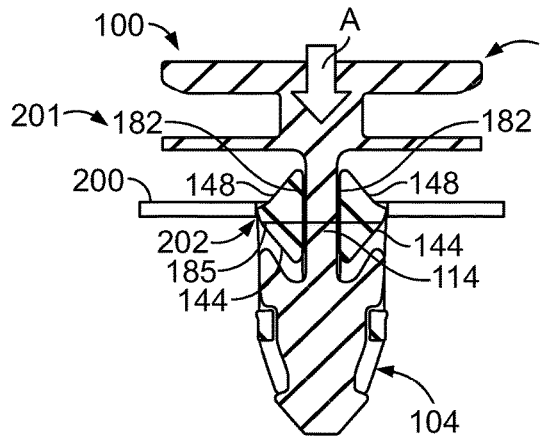
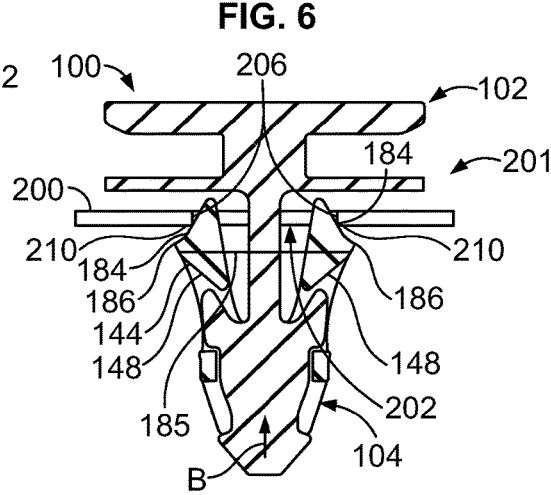
FIG. 7  FIG. 8
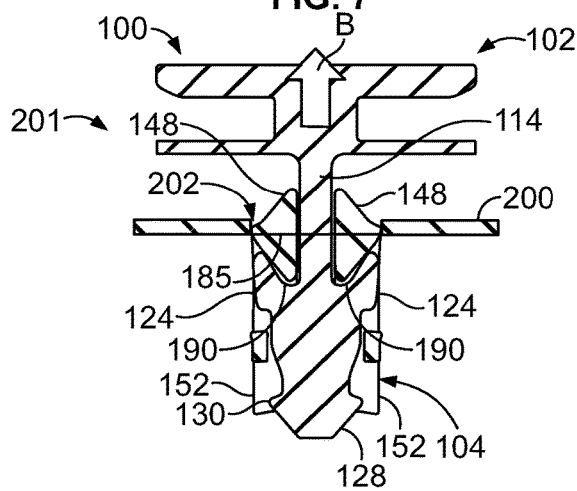
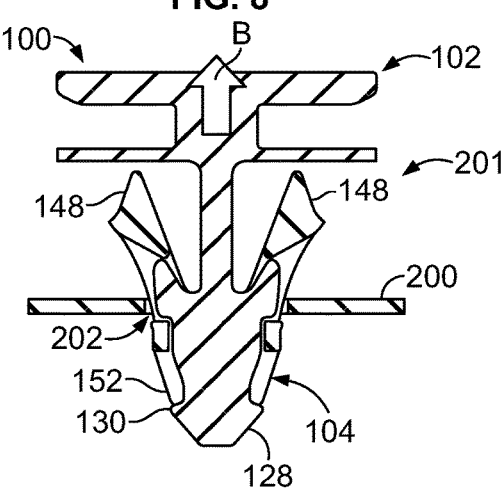
FIG. 9  FIG. 10

REUSABLE FASTENING CLIP ASSEMBLY

RELATED APPLICATIONS

This application is a National Phase of International Application No. PCT/US2016/016124, filed Feb. 2, 2016, which relates to and claims priority benefits from U.S. Provisional Patent Application No. 62/132,083 entitled "Reusable Fastening Clip Assembly," filed Mar. 12, 2015, both of which are hereby incorporated by reference in their entireties.

International Application No. PCT/US2016/016124 also relates to and claims priority benefits from U.S. Provisional Patent Application No. 62/195,382 entitled "Reusable Fastening Clip Assembly," filed Jul. 22, 2015, which is also hereby incorporated by reference in its entirety.

FIELD OF EMBODIMENTS OF THE DISCLOSURE

Embodiments of the present disclosure generally relate to fastening clip assemblies, and, more particularly, to fastening clip assemblies that may be reused.

BACKGROUND

Various assemblies include panels or objects connected to one another. Automobile assemblies, for example, include various panels and structures connected to other panels or structures, or to the automobile frame itself. Snap-fit assemblies may be used to connect the pieces together. Additionally, a fastener may be preassembled with one of the components or panels, while the second component or panel is connected to the preassembly during final assembly. A plurality of the fasteners may be used when connecting relatively large components together. Such fasteners have been provided in a variety of shapes and configurations suitable for the particular components to be connected.

One type of fastener used to connect components together is a symmetrical connector having an insertion portion with a W-shape. W-shape fasteners provide quick and easy assembly. Additionally, the W-shape fasteners securely retain moldings of structural panels, while also being relatively easy to remove.

Another type of known fastener includes opposed securing members that axially collapse as the fastener is inserted into an opening of a panel. The axial collapsing of the opposed securing members allows the opposed securing members to pass through the opening.

Known fasteners are also described in U.S. Pat. No. 6,796,006, entitled "Rib Clip," U.S. Pat. No. 6,974,292, entitled "One-Piece Reusable Plastic Fastener," and U.S. Pat. No. 8,613,128, entitled "Push-In Fastener Assembly."

Typically, once a fastener is inserted into an opening for use, it is unable to be reused if removed. For example, during removal, portions of the fastener may snap or otherwise break, or simply not provide sufficient retaining force any longer. A known W-shaped fastener includes a pin having wings that outwardly flare. Upon removal of the pin, the wings may snap or otherwise break. Further, after the pin has been removed, a grommet of the fastener typically remains in an attachment hole of a component after the pin is removed.

In general, the fastener is unable to be reused, as the pin may be damaged after removal. Also, an individual may need to use a separate and distinct tool to remove the grommet that remains within the attachment hole, which may damage the component and/or the grommet.

SUMMARY OF EMBODIMENTS OF THE DISCLOSURE

A need exists for a fastening clip assembly that may be reused. A need exists for a fastening clip assembly that is uncompromised after it has been removed from a component. A need exists for a fastening clip assembly that may be removed from a component without causing damage to the fastening clip assembly or the component.

With those needs in mind, certain embodiments of the present disclosure provide a fastening clip assembly that is configured to be selectively connected and disconnected from a component. The fastening clip assembly may include a main body including a pin having a nose and at least one clip extending from a portion of the pin. A retaining sleeve receives and removably retains the pin. The retaining sleeve may include a tube defining a channel that receives the nose, and at least one wing having a locking head. The wing(s) inwardly deflects when the fastening clip assembly is inserted into an attachment hole of the component. The wing(s) is inwardly deflected by the clip(s) as the fastening clip assembly is removed from the attachment hole of the component.

The main body and the retaining sleeve may cooperate to provide a two-stage release from the attachment hole of the component. In at least one embodiment, the retaining sleeve includes two opposed wings. The locking head may include at least one ramped surface.

The retaining sleeve may include a tapered pin retainer that is configured to retain the nose of the pin. In at least one embodiment, the tapered pin retainer includes a plurality of wall segments separated by slots. The nose and the retaining sleeve may include beveled surfaces that guide the fastening clip assembly into the attachment hole.

In at least one embodiment, outer surfaces of the locking head are rounded. An outer edge of the locking head may be devoid of a right angle. For example, the outer edge of the locking head may be rounded. At least a portion of an outer surface of the locking head may conform to a shape of the attachment hole.

Certain embodiments of the present disclosure provide a selective securing system that may include a component having an attachment hole, and a fastening clip assembly that selectively connects and disconnects from the component. The fastening clip assembly may include a main body including a pin having a nose and two opposed clips extending from an insertion body of the pin, and a retaining sleeve that receives and removably retains the pin. The retaining sleeve may include a tube defining a channel that receives the nose, and two opposed wings. Each of the opposed wings may include a locking head. The opposed wings inwardly deflect when the fastening clip assembly is inserted into the attachment hole of the component. The opposed wings are inwardly deflected by the opposed clips as the fastening clip assembly is removed from the attachment hole of the component.

BRIEF DESCRIPTION OF SEVERAL VIEWS OF THE DRAWINGS

FIG. 1 illustrates a front view of a fastening clip assembly in which a main body is separated from a retaining sleeve, according to an embodiment of the present disclosure.

FIG. 2 illustrates a front view of a fastening clip assembly in which a main body is secured to a retaining sleeve, according to an embodiment of the present disclosure.

FIG. 3 illustrates a perspective lateral view of a fastening clip assembly in which a main body is secured to a retaining sleeve, according to an embodiment of the present disclosure.

FIG. 5 illustrates an axial cross-sectional view of a fastening clip assembly aligned with an attachment hole of a component, according to an embodiment of the present disclosure.

FIG. 6 illustrates an axial cross-sectional view of a fastening clip assembly initially passed through an attachment hole of a component, according to an embodiment of the present disclosure.

FIG. 7 illustrates an axial cross-sectional view of a fastening clip assembly intermediately passed through an attachment hole of a component, according to an embodiment of the present disclosure.

FIG. 8 illustrates an axial cross-sectional view of a fastening clip assembly fully installed and connected to a component, according to an embodiment of the present disclosure.

FIG. 9 illustrates an axial cross-sectional view of a fastening clip assembly initially removed from an attachment hole of a component, according to an embodiment of the present disclosure.

FIG. 10 illustrates an axial cross-sectional view of a fastening clip assembly intermediately removed from an attachment hole of a component, according to an embodiment of the present disclosure.

Figure 4:
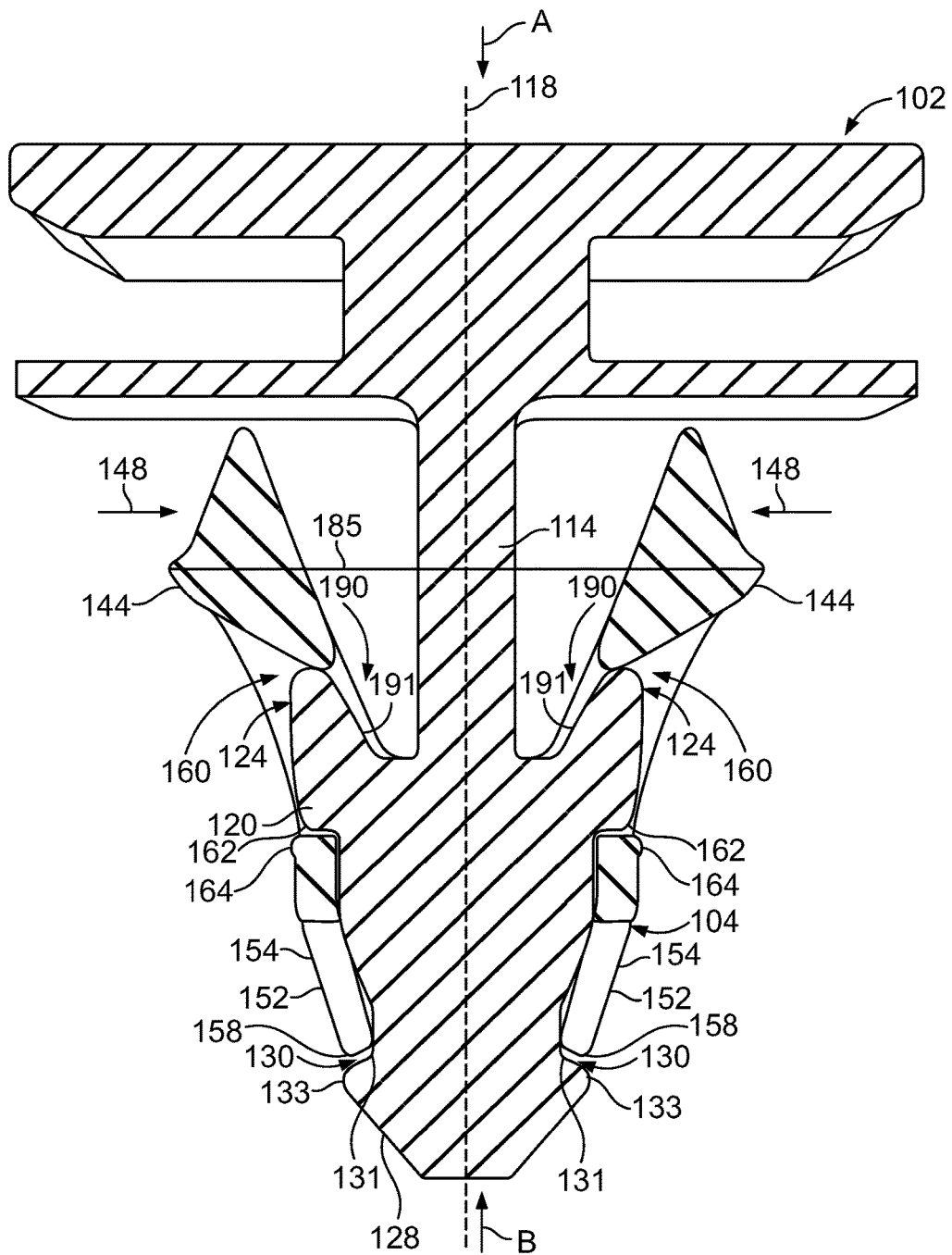
FIG. 4 illustrates an axial cross-sectional view of a fastening clip assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a fastening clip assembly that is configured to be serviced and reused. As such, the fastening clip assembly may be removed from an attachment hole of a component (such as a panel), and reinserted into the same attachment hole, or another attachment hole. Embodiments of the present disclosure provide a fastening clip assembly that may be configured to provide a two stage release mechanism that prevents damage during removal from a component, and allows the fastening clip assembly to be reused.

Embodiments of the present disclosure provide a fastening clip assembly that may be inserted and removed from an attachment hole of a component multiple times without breaking, while maintaining functionality. That is, the fastening clip assembly may be reusable while maintaining retention force.

FIG. 1 illustrates a front view of a fastening clip assembly 100 in which a main body 102 is separated from a retaining sleeve (such as a wing body) 104, according to an embodiment of the present disclosure. The main body 102 and the retaining sleeve 104 may be formed of plastic, for example. The fastening clip assembly 100 may be formed and molded as two separate pieces, such as shown in FIG. 1, or integrally molded and formed as a single piece. For example, the main body 102 may be integrally molded, formed and connected to a portion of the retaining sleeve 104 through a flash connection that is configured to be broken as the main body 102 is driven into the retaining sleeve 104.

The main body 102 may include a connection head 106 and a pin 108 extending from the head 106. The head 106 may include opposed retaining collars 110 and 112 separated by a central beam 114. The retaining collars 110 and 112 cooperate to secure to a structure (such as a panel, hook, wire, string, and/or the like) therebetween.

The pin 108 may include an extension beam 114 outwardly extending from an outer surface 116 of the collar 112 opposite from the collar 110. The extension beam 114 may be coaxially aligned with a central longitudinal axis 118 of the main body 102. An expanded insertion body 120 extends from a distal end 122 of the extension beam 114. The insertion body 120 includes opposed clips 124 that extend laterally and upwardly from the insertion body 120 proximate to the distal end 122 of the extension beam 114.

The insertion body 120 may also include a tapered intermediate portion 126 that connects to a nose 128. The nose 128 may include an annular ridge 130 that connects to a distal tip 132 through a beveled cone 134 that tapers down from the annular ridge 130 to the distal tip 132.

The retaining sleeve 104 may include an annular tube 140 having a central passage 142 formed therethrough. Opposed wings 144 outwardly and upwardly extend from an upper rim 145 of the tube 140. Each wing 144 may include an outwardly-flared arm 146 having a distal locking head 148, which may include an outer ramped surface 150. A tapered pin retainer 152 extends downwardly from the tube 140 opposite from the upper rim 146. The pin retainer 152 may include tapered wall segments 154 separated by one or more slots 156.

In operation, the main body 102 is urged into the retaining sleeve 104 in the direction of arrow A. As the main body 102 is urged in the direction of arrow A, the nose 128 passes into the central passage 142. As the main body 102 continues to be urged into the central passage 142 in the direction of arrow A, the beveled cone 134 slides past interior surfaces of the wall segments 154, which may outwardly flex to accommodate the movement of the beveled cone 134. As the beveled cone 134 moves downwardly past the well segments 154 through the pin retainer 152, the wall segments 154 may flex back to their at-rest positions, and the annular ridge 130 abuts against distal edges 158 of the pin retainer 152, thereby preventing the main body 102 from undesirably retreating in relation to the retaining sleeve 104 in the direction of arrow B. Notably, an individual may exert sufficient disconnection force into the main body 102 to remove the annular ridge 130 from the distal edges 158. With sufficient force exerted into the main body 102, the wall segments 154 outwardly flex, thereby disengaging from the annular ridge 130, thereby allowing the main body 102 to upwardly shift in relation to the retaining sleeve 104.

FIG. 2 illustrates a front view of the fastening clip assembly 100 in which the main body 102 is secured to the retaining sleeve 104. As shown in FIG. 2, the main body 102 is fully mated with the retaining sleeve 104. In the fully mated state, the nose 128 extends through the pin retainer 152 such that the annular ridge 130 of the nose 128 abuts against the distal edges 158 of the pin retainer 152.

FIG. 3 illustrates a perspective lateral view of the fastening clip assembly 100 in which the main body 102 is secured to the retaining sleeve 104. FIG. 4 illustrates an axial cross-sectional view of the fastening clip assembly 100. Referring to FIGS. 3 and 4, each of the wings 144 may include a channel 160 formed therethrough. Edges 162 of the insertion body 120 may abut into lower ledges 164 of the retaining sleeve 104 that define bottom boundaries of the channels 160. In particular, lower edges 162 of the clips 124 may abut into the ledges 164. The abutting relationship between the edges 162 of the insertion body 120 and the ledges 164 prevent the main body 102 from passing further into the retaining sleeve 104 in the direction of arrow A, while the abutting relationship between the annular ridge 130 of the nose 128 and the distal edges 158 of the pin retainer 152 prevent the main body 102 from undesirably retreating through the retaining sleeve 104 in the direction of arrow B. Further, a distal edge 170 of the extension beam 114 may abut into the upper rim 145 of the retaining sleeve 104. As such, the retaining sleeve 104 securely retains the main body 102.

As shown in FIG. 4, recesses 190 may be formed between the clips 124 and the outer surface of the extension beam 114. The recesses 190 are sized and shaped to retain the locking heads 148 therein when the main body 102 is slid upwardly in relation to the retaining sleeve 104. The recesses 190 are reciprocally-shaped in relation to the locking heads 148. When sufficient disconnection force is exerted into the main body 102 in the direction of arrow B, the angle of the ridge 130 forces the wall segments 154 to spread open. As shown, the angle of the ridge may not be perpendicular to the longitudinal axis 118. Instead, the angle of the ridge 130 may downwardly cant from an interior base 131 to an exterior edge 133. Accordingly, when a disconnection force is exerted in the direction of arrow A, the ridge 130 does not snag on the wall segments 154, but spreads the wall segments open, such that the nose 128 slides upwardly between the wall segments 154 in the direction of arrow B.

As the nose 128 separates from the pin retainer 152 and moves upwardly in the direction of arrow A, interior surfaces 191 of the clips slide over outer surfaces of the locking heads 148, thereby squeezing the opposed locking heads 148 towards the extension beam 114, and reducing the envelope 185 between the locking heads 148. The locking heads 148 may be retained within the recesses 190. As explained below with respect to FIGS. 9 and 10, such movement allows the fastening clip assembly 100 to be removed from a component. The removal process may be a two stage process in which the nose 128 first disengages from a secure connection with the pin retainer 152, and then the clips 124 inwardly compress the locking heads 148.

FIG. 5 illustrates an axial cross-sectional view of the fastening clip assembly 100 aligned with an attachment hole 202 of a component 200 (such as a panel, sheet, wall, and/or the like), according to an embodiment of the present disclosure. The fastening clip assembly 100 is configured to secure to the component 200 to provide a selective securing system 201 in which the fastening clip assembly 100 may be selectively connected and disconnected (for example, repeatedly disconnected and reused) from the component 200. In order to insert the fastening clip assembly 100 into the attachment hole 202, the fastening clip assembly 100 is aligned such that the longitudinal axis 118 is aligned (for example, centered) with a center 204 of the attachment hole 202. If not aligned in such a manner, the beveled surfaces of the nose 128 and the pin retainer 152 automatically guide the fastening clip assembly 100 into the attachment hole 202 as the fastening clip assembly 100 is urged into the attachment hole 202 in the direction of arrow A, and the tapered surfaces slide over internal edges 206 of the component 200 that define the attachment hole 202.

FIG. 6 illustrates an axial cross-sectional view of the fastening clip assembly 100 initially passed through the attachment hole 202 of the component 200. As the outwardly-flared arms 146 of the wings 144 slide over the internal edges 206, the arms 146 flex inwardly, and ramped lower surfaces 180 of the locking heads 148 above the channels 160 slide over the internal edges 206.

FIG. 7 illustrates an axial cross-sectional view of the fastening clip assembly 100 intermediately passed through the attachment hole 202 of the component 200. With continued urging in the direction of arrow A, the wings 144 deflect toward one another. In this position, interior flat surfaces 182 of the locking heads 148 may compress against the extension beam 114, thereby minimizing the distance between the locking heads 148 so that the compressed envelope 185 spanning between the opposed locking heads 148 is smaller than the diameter of the attachment hole 202. As such, the wings 144 may pass through the attachment hole 202.

FIG. 8 illustrates an axial cross-sectional view of the fastening clip assembly 100 fully installed and connected to the component 200. With continued urging in the direction of arrow A (shown in FIG. 7), the lower surfaces 180 of the locking heads 148 pass through the attachment hole 202, and the wings 144 flex outwardly. Outer ramped surfaces 184 of the locking heads 148 abut against the internal edges 206 of the component 200. Notably, the expanded envelope 185 between the locking heads 148 is greater than the diameter of the attachment hole 202, thereby securing the fastening clip assembly 100 to the component 200. Outer ridges 186 of the locking heads 148 ensure that the fastening clip assembly 100 remains secured to the component 200 if an undesired force is exerted in the direction of arrow B. For example, if a force is exerted in the direction of arrow B, the fastening clip assembly 100 may slide up in the direction of arrow B, but the ridges 186 catch on lower surfaces 210 of the component 200, thereby preventing the fastening clip assembly 100 from ejecting out of the attachment hole 202.

FIG. 9 illustrates an axial cross-sectional view of the fastening clip assembly 100 initially removed from an attachment hole 202 of the component 200. FIG. 10 illustrates an axial cross-sectional view of the fastening clip assembly 100 intermediately removed from the attachment hole 202 of the component 200. Referring to FIGS. 9 and 10, as the fastening clip assembly 100 is removed from the component 200, the locking heads 148 remain within the attachment hole 202 until sufficient force releases the pin retainer 152 from the ridge 130 of the nose 128 of the main body 102. Such movement allows the locking heads 148 to flex inwardly toward the central beam 114, as shown in FIG. 9.

In particular, as the main body 102 shifts upwardly relative to the retaining sleeve 104 in the direction of arrow B, the clips 124 slide over outer surfaces of the locking heads 148, thereby compressing the locking heads 148 toward one another, as described above with respect to FIG. 4. The locking heads 148 collapse inwardly so that the envelope 185 between the locking heads 148 is smaller than the diameter of the attachment hole 202, thereby allowing the fastening clip assembly 100 to release from the attachment hole 202. After the locking heads 148 pass through the attachment hole 202 in the direction of arrow B, the wings 144 of the retaining sleeve 104 snap back to at-rest positions, allowing the fastening clip assembly 100 to be removed from the component 200 and reinstalled as desired, as shown in FIG. 10.

Notably, as shown in FIG. 9, as the pin retainer 152 releases from the ridge 130 of the nose 128, the main body 102 slides up relative to the retaining sleeve 104 in the direction of arrow B. As such, the clips 124 engage the locking heads 148 and squeeze the locking heads 148 toward one another. The locking heads 148 may be compressed by the clips 124 and slide into the recesses 190, which retain the locking heads 148 in place. As the clips 124 fully engage the locking heads 148, the clips 124 compress the locking heads 148 toward one another so that the compressed envelope 185 between the locking heads 148 is smaller than the diameter of the attachment hole 202, thereby allowing the fastening clip assembly 100 to be removed from the component 200.

As described above with respect to FIGS. 9 and 10, the fastening clip assembly 100 provides a two-stage release mechanism that allows the fastening clip assembly 100 to be reused. In particular, the pin retainer 152 of the retaining sleeve 104 latches to the nose 128 of the main body 102 until sufficient force separates the connection therebetween. In response, the clips 124 of the main body 102 force the locking heads 148 inwardly until the fastener assembly 100 releases from the attachment hole 202.

Figure 11:
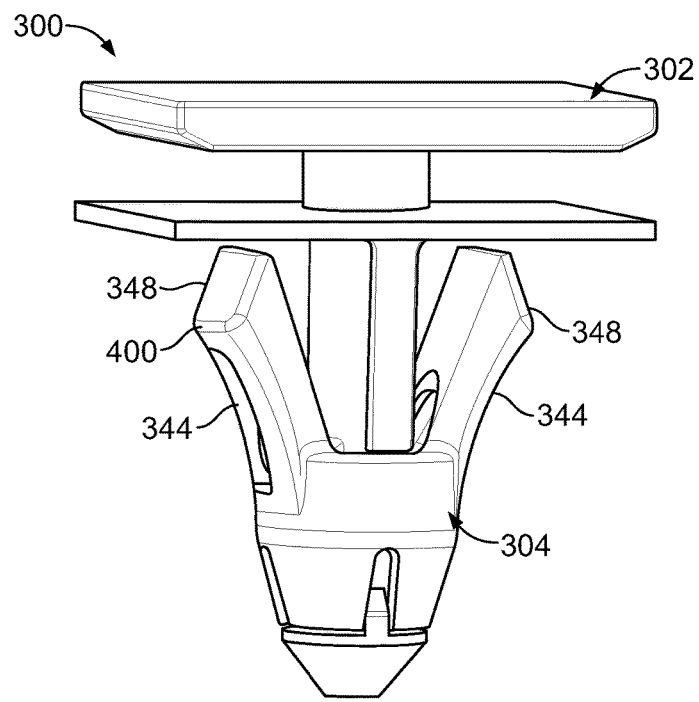
FIG. 11 illustrates a perspective front view of a fastening clip assembly, according to an embodiment of the present disclosure.
Figure 12:
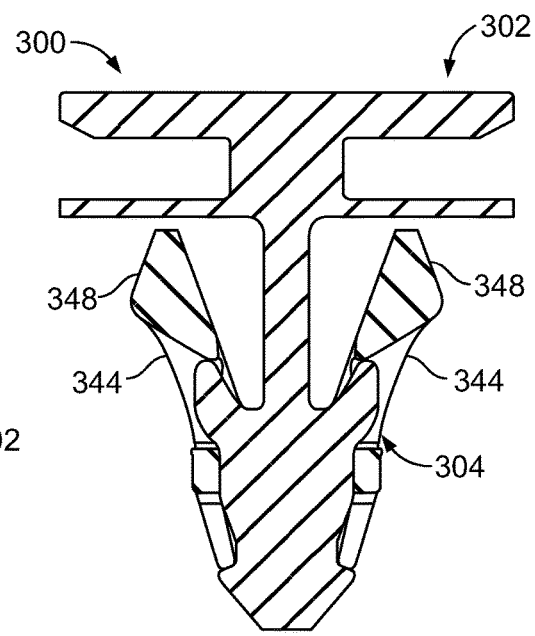
FIG. 12 illustrates an axial cross-sectional view of a fastening clip assembly, according to an embodiment of the present disclosure.

FIG. 11 illustrates a perspective front view of a fastening clip assembly 300, according to an embodiment of the present disclosure. FIG. 12 illustrates an axial cross-sectional view of a fastening clip assembly 300. The fastening clip assembly 300 is similar to the fastening clip assembly 100 shown and described above. The fastening clip assembly 300 includes a main body 302 and a retaining sleeve 304, as described above.

Figure 13:
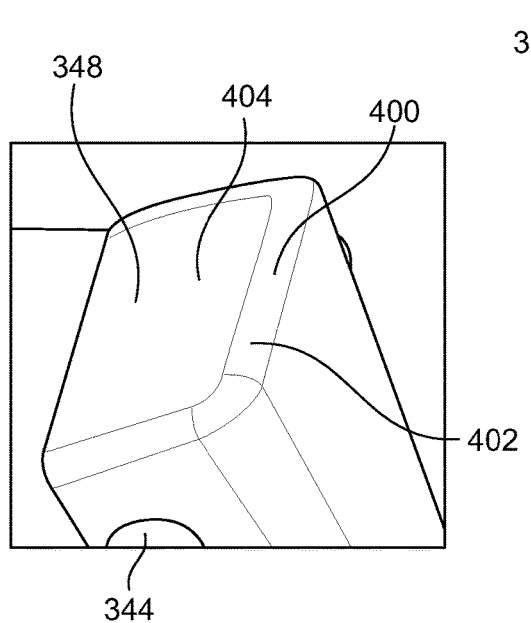
FIG. 13 illustrates a perspective lateral view of a locking head of a wing of a retaining sleeve, according to an embodiment of the present disclosure.

FIG. 13 illustrates a perspective lateral view of a locking head 348 of a wing 344 of the retaining sleeve 304, according to an embodiment of the present disclosure. Referring to FIGS. 11 and 13, the locking heads 348 are rounded, smoothed, blunted, or the like. For example, outer edges 400 of the locking heads 348 are rounded. That is, the outer edges 400 may not include sharp edges, such as perpendicular connections that may snag on portions of a component surrounding a hole. The shape of the rounded edges 400 may conform to a curvature of a hole, in order to allow for passage therethrough without snagging. The rounded outer edges 400 eliminate, minimize, or otherwise reduce a possibility that the locking heads 348 snag onto a component, which may cause the locking heads 348 and/or the wings 344 to shear off the retaining sleeve 304. It has been found that the locking heads 348 may be repeatedly inserted and removed from holes without breaking.

As shown in FIG. 13, an outer periphery 402 of the locking heads 348 may be rounded, such as being smoothed and blunted. The outer periphery 402 may be devoid of sharp edges, such as right angle connections. An upper surface 404 of the locking head 348 may also be rounded, such as having a radiused surface, instead of a flat surface. In particular, the upper surface 404 may have a round outer surface that is configured to match, conform to, or otherwise cooperative with a curvature of an attachment hole of a component.

Referring to FIGS. 1-13, embodiments of the present disclosure provide a fastening clip assembly that is configured to be serviced and reused. The fastening clip assembly may be removed from an attachment hole of a component (such as a panel), and reinserted into the same attachment hole, or another attachment hole. The fastening clip assembly may be configured to provide a two stage release mechanism that prevents damage during removal from a component, and allows the fasting clip assembly to be reused.

Additionally, a washer seal may be secured to the fastening clip assembly. Optionally, or alternatively, an elastomeric material may be molded to the fastening clip assembly. The washer seal or elastomeric material may be used to prevent moisture, dust, vapor, and/or the like from passing through the attachment hole when the fastening clip assembly is secured therein.

In contrast to previously known fastener clips, embodiments of the present disclosure provide a fastening clip assembly that may be reused. Further, the fastening clip assembly is uncompromised after it has been removed from a component. The fastening clip assembly may be removed from a component without causing damage to the fastening clip assembly or the component.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fastening clip assembly that is configured to be selectively connected and disconnected from a component, the fastening clip assembly comprising:

a main body including a pin having a nose, and at least one clip extending from a portion of the pin; and
a retaining sleeve that receives and removably retains the pin, the retaining sleeve including
a tube defining a channel that receives the nose, and at least one wing having a locking head, wherein the at least one wing inwardly deflects when the fastening clip assembly is inserted into an attachment hole of the component,
the locking head extends through a plane defined by a lower surface of the component when the fastening clip assembly is installed in the component,
the clip faces the lower surface when the fastening clip assembly is installed in the component, and
the at least one wing is inwardly deflected by the at least one clip as the fastening clip assembly is removed from the attachment hole of the component.

2. The fastening clip assembly of claim 1, wherein the main body and the retaining sleeve cooperate to provide a two-stage release from the attachment hole of the component.

3. The fastening clip assembly of claim 1, wherein the at least one wing comprises two opposed wings.

4. The fastening clip assembly of claim 1, wherein the locking head comprises at least one ramped surface.

5. The fastening clip assembly of claim 1, wherein the retaining sleeve further comprises a tapered pin retainer that is configured to retain the nose of the pin.

6. The fastening clip assembly of claim 5, wherein the tapered pin retainer comprises a plurality of wall segments separated by slots.

7. The fastening clip assembly of claim 1, wherein the nose and the retaining sleeve include beveled surfaces that guide the fastening clip assembly into the attachment hole.

8. The fastening clip assembly of claim 1, wherein outer surfaces of the locking head are rounded.

9. The fastening clip assembly of claim 1, wherein an outer edge of the locking head is devoid of a right angle.

10. The fastening clip assembly of claim 1, wherein an outer edge of the locking head is rounded.

11. The fastening clip assembly of claim 1, wherein at least a portion of an outer surface of the locking head conforms to a shape of the attachment hole.

12. A selective securing system comprising:
a component having an attachment hole; and
a fastening clip assembly that selectively connects and disconnects from the component, the fastening clip assembly comprising
a main body including a pin having a nose,
and two opposed clips extending from an insertion body of the pin, and
a retaining sleeve that receives and removably retains the pin, the retaining sleeve including
a tube defining a channel that receives the nose, and two opposed wings, wherein each of the opposed wings includes a locking head, the opposed wings inwardly deflect when the fastening clip assembly is inserted into the attachment hole of the component,
the locking heads extend through a plane defined by a lower surface of the component when the fastening clip assembly is installed in the component,
the opposed clips face the lower surface when the fastening clip assembly is installed in the component, and
the opposed wings are inwardly deflected by the opposed clips as the fastening clip assembly is removed from the attachment hole of the component.

13. The selective securing system of claim 12, wherein the main body and the retaining sleeve cooperate to provide a two-stage release from the attachment hole of the component.

14. The selective securing system of claim 12, wherein the retaining sleeve further comprises a tapered pin retainer that is configured to retain the nose of the pin.

15. The selective securing system of claim 14, wherein the tapered pm retainer comprises a plurality of wall segments separated by slots.

16. The selective securing system of claim 12, wherein the nose and the retaining sleeve include beveled surfaces that guide the fastening clip assembly into the attachment hole.

17. The selective securing system of claim 12, wherein outer surfaces of the locking head are rounded.

18. The selective securing system of claim 12, wherein an outer edge of the locking head is devoid of a right angle.

19. The selective securing system of claim 12, wherein at least a portion of an outer surface of the locking head conforms to a shape of the attachment hole.

20. A fastening clip assembly that is configured to be selectively connected and disconnected from a component, the fastening clip assembly comprising:
a main body including a pin having a nose and two opposed clips extending from an insertion body of the pin; and
a retaining sleeve that receives and removably retains the pin, the retaining sleeve including
(a) a tube defining a channel that receives the nose,
(b) two opposed wings, wherein each of the opposed wings includes a locking head having at least one ramped surface, outer surfaces of the locking head are rounded, and
at least a portion of an outer surface of the locking head conforms to a shape of an attachment hole of the component, and
(c) a tapered pin retainer that is configured to retain the nose of the pin, wherein the tapered pin retainer comprises a plurality of wall segments separated by slots,
wherein: the opposed wings inwardly deflect when the fastening clip assembly is inserted into the attachment hole of the component,
the locking heads extend through a plane defined by a lower surface of the component when the fastening clip assembly is installed in the component,
the opposed clips face the lower surface when the fastening clip assembly is installed in the component,
the opposed wings are inwardly deflected by the opposed clips as the fastening clip assembly is removed from the attachment hole of the component, and
the main body and the retaining sleeve cooperate to provide a two-stage release from the attachment hole of the component.

* * * * *